Nov. 29, 1938.  H. MAXWELL  2,138,661

METHOD OF MAKING DYNAMO-ELECTRIC MACHINES

Filed April 1, 1937

Inventor:
Howard Maxwell,
by Harry E. Dunham
His Attorney.

Patented Nov. 29, 1938

2,138,661

UNITED STATES PATENT OFFICE 2,138,661

METHOD OF MAKING DYNAMO-ELECTRIC MACHINES

Howard Maxwell, Schenectady, N. Y., assignor to General Electric Company, a corporation of New York Application April 1, 1937, Serial No. 134,321

5 Claims. (Cl. 29—155.53)

My invention relates to improvements in the method of making dynamo-electric machines, and particularly to that type of machine which utilizes a laminated core and a cast winding.

Various methods have been devised for forming cast windings in laminated core structures for dynamo-electric machines, and these may be classified broadly in two groups, one of which includes a core structure wherein the winding slots extend to the outer periphery of the laminated core, generally known as the open slot winding, and in the other of which the winding slots do not extend to the outer periphery of the laminated core, and which is generally known as a closed slot winding. Both of these windings possess inherent characteristics which are undesirable in certain types of motors. In casting the open slot windings, the conductor metal tends to fill up the slot opening between adjacent teeth, with the result that the magnetic flux which traverses the air gap between the rotatable and stationary members of the dynamo-electric machine is cut by this portion of the cast conductors, and produces eddy current losses. Furthermore, the peripheral surface of such a core and winding usually is reduced in diameter after casting the winding, as by turning on a lathe, in order to provide a smooth peripheral surface of the desired diameter. This machining of the peripheral surface of the core and winding tends to short circuit adjacent core laminations by forcing the conductor metal in the restricted portion of the slot between the core tooth tip laminations, thereby further increasing eddy current core losses. In the closed slot type of winding the reactance is generally very high, and there is considerable tooth tip fringing of the magnetic flux between adjacent core teeth, both of which effects are generally undesirable in dynamo-electric machines.

An object of my invention is to provide an improved method of making a dynamo-electric machine of the type wherein the conductors of an open slot cast winding do not extend to the peripheral surface between adjacent tooth tips of a laminated core.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
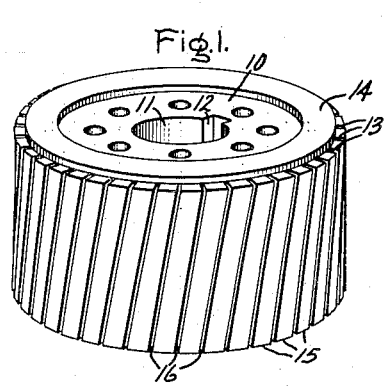
Figure 2:
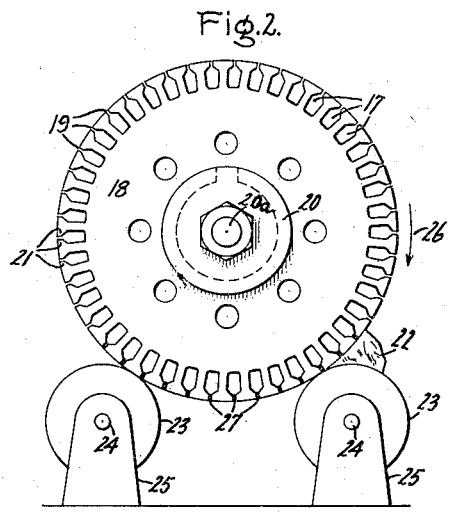
Figure 3:
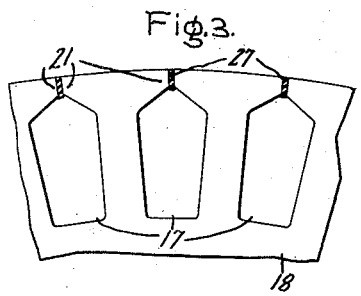
Figure 4:
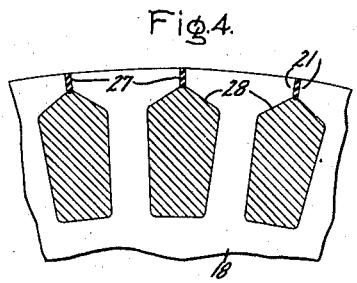
Figure 5:
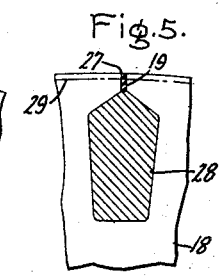
Figure 6:
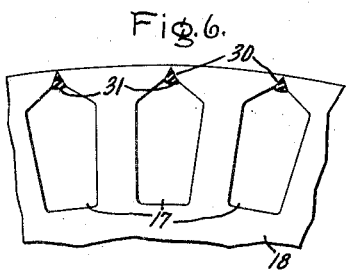
Figure 7:
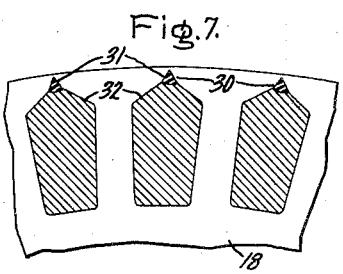
Figure 8:
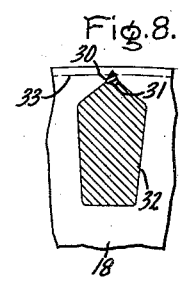

In the drawing, Fig. 1 is a perspective view of a rotor of a dynamo-electric machine embodying my invention; Fig. 2 is an end elevation illustrating one method of applying a flowable insulating filler to restricted openings between adjacent tooth tips of a laminated core; Fig. 3 is an enlarged view of a part of a laminated dynamo-electric machine core illustrating the arrangement of the insulating filler in the restricted opening between tooth tips of an open slot winding before the winding is cast in the core; Fig. 4 illustrates a sectional view through the core shown in Fig. 3 after the winding has been cast into the winding slots in the core; Fig. 5 illustrates the original and the final peripheral surface dimensions of the core shown in Fig. 4; Fig. 6 illustrates another method of making the winding slots in a core lamination and the arrangement of the insulating filler in a notch formed on the outer side of the winding slots; Fig. 7 illustrates a section through a dynamo-electric machine core similar to Fig. 6, wherein a winding has been cast in the winding slots; and Fig. 8 illustrates the original and the final peripheral dimensions of the core shown in Fig. 7.

Referring to the drawing, I have shown in Fig. 1 a rotor of a squirrel-cage induction motor having a laminated core 10 provided with a central opening 11 adapted to be secured to a shaft extending through this opening by a key fitting in a keyway 12. The squirrel-cage winding comprises cast conductors which are arranged in the winding slots 13 and are all connected together at each end of the conductors by a cast end-ring 14. The conductors in the winding slots 13 do not extend to the outer periphery of the laminated core tooth tips 15, but these tooth tips are magnetically and electrically separated by an air gap 16. I have found that such a construction reduces the reactance of the machine, and reduces tooth tip fringing of the magnetic flux between adjacent tooth tips. Furthermore, I have found that this construction increases the efficiency of the machine by providing better electrical insulation between the tooth tips of the laminations and by reducing eddy current losses in the winding conductors. In making such a winding, I have found it desirable to form a series of winding slots 17 in the core laminations 18, and to provide a restricted portion on the outer edge of the winding slots small relative to the body portion of the slots, which may, or may not, extend to the peripheral edge of the laminations.

In the arrangement shown in Figs. 2, 3, 4, and 5, the restricted portion is in the form of a very small opening 19 in the order of .04" wide, or at least less than .07" wide. After the slots have been formed in the core laminations, a group of these laminations are assembled on a mandrel 20, so that corresponding slots in the laminations are arranged in intercommunicating relation. A bolt 20a is then inserted to clamp together the ends of the mandrel 20 and secure the laminations 18 in assembled relation. In order to prevent the molten metal used in making the cast winding from entering the restricted openings 19 between the tooth tips 21, I have found it desirable to close the communication between the winding slots 17 and the outer part of the restricted portion 19 by filling the restricted portion with a hardenable flowable insulating filler. This flowable filler may comprise a semifluid plastic putty, a heavy varnish, or other similar material which is readily hardenable by drying or heating, and sufficiently adhesive not to loosen from the restricted notch when the metal is cast in the winding slot. In order to conveniently apply this insulating filler to the restricted openings 19, I place the flowable filler 22, which may comprise a semifluid plastic putty, made flowable by the addition of a large amount of thinner, upon one roll of a pair of steel rolls 23, rotatably supported by parallel spaced shafts 24 on mountings 25. The assembled laminated core is then placed upon the rolls 23 with its axis parallel to the axes of the rolls 23, as shown in Fig. 2, and is then rotated as indicated by the arrow 26. This rotation of the core forces the thin flowable insulating filler 22 into the small openings 19, and substantially fills these openings, as shown at 27 in Fig. 3. The insulating filler 27, which has been forced into the restricted openings 19, is then hardened in any suitable manner, as by air drying, or by heating in an oven. When the filler has been sufficiently hardened, the laminated core is placed in position in the casting machine, with the molds arranged about each end of the core. The winding is then cast to provide winding conductors extending axially through the series of winding slots 17, and a pair of end rings arranged on each end of the core interconnecting all of the ends of the winding conductors. With this arrangement, I have found that it is unnecessary to provide a mold along the cylindrical peripheral surface of the core 18 for retaining the molten metal 28 within the conductor slots in the laminated core, as the hardened insulating filler is sufficiently cohesive, as well as adhesive to the surfaces of the tooth tips 21, to resist the pressure of the molten casting metal 28, and restrict it to the winding slots 17, as shown in Fig. 4. It is usually desirable to provide the rotor with a smooth cylindrical surface, and this may readily be done by grinding or turning down the outer peripheral surface of the core 18 to the desired diameter, as indicated by the line 29 in Fig. 5. In reducing the diameter of the laminated core 18, it is necessary that the final diameter be limited to the range of diameters determined by the insulation closed restricted slot portion 19. If the diameter is reduced beyond this range of diameters the machining of the peripheral surface will bring the tool into contact with the cast conductors and produce a high eddy current loss rotor similar to the conventional open slot cast squirrel-cage winding.

Another method of making a relatively small restricted portion on the outer side of the winding slots 17 is illustrated in Fig. 6. In this construction, core laminations are formed with a series of closed winding slots with the restricted portion on the outer side thereof in the form of a relatively small restricted V-notch 30. A group of these laminations are then assembled with corresponding winding slots arranged in interconnecting relation, and are securely clamped together on a mandrel. A hardenable flowable insulating filler 31 is then applied to the restricted portions 30 of the slots 17. This may be done by using a flowable filler, such as an insulating varnish, or similar material, which may be sprayed into the winding slots, or the assembled laminated core may be dipped into the filler material. The V-notches 30 are made sufficiently small, and the insulating varnish, or other filler material, must be sufficiently cohesive and adhesive, so that it will substantially fill the V-notches 30, and yet will not adhere appreciably to the inner surfaces of the winding slots 17. This feature insures that the cast conductors will be of the desired size without the necessity of reducing the width of the teeth. After the insulating filler has been applied to the V-notches 30, it is hardened in any suitable manner, and the winding is cast in any conventional manner for making closed slot windings. This produces a closed slot winding in which the winding conductors 32 do not extend into the restricted portion formed by the V-notches 30 on the outer sides of the winding slots, as shown in Fig. 7. In order to obtain the advantages of an open slot winding, the outer diameter of the laminated core is reduced in any suitable manner, as by grinding or turning on a lathe, to such a diameter as to open the restricted V-notches to the external periphery of the laminations, as indicated by the line 33 in Fig. 8, thereby forming an open slot laminated core.

While I have illustrated and described particular modes of carrying out my invention, modifications thereof will occur to those skilled in the art. I desire it to be understood, therefore, that my invention is not to be limited to the particular method disclosed, and I intend in the appended claims to cover all modifications which do not depart from the spirit and scope of my invention.

What I claim as new and desire to secure by Letters Patent of the United States is:

1. The method of making an open slot winding dynamo-electric machine which comprises forming a series of winding slots in core laminations with a restricted portion on the outer edge of the slots small relative to the body portion of the slots, assembling a group of the laminations with the winding slots arranged in intercommunicating relation, filling the restricted portion of the slots with a hardenable flowable insulating filler, hardening the filler therein, and casting a winding in the winding slots.

2. The method of making an open slot winding dynamo-electric machine which comprises forming a series of substantially closed winding slots in core laminations with a restricted portion on the outer side of the slots small relative to the body portion of the slots, assembling a group of the laminations with corresponding winding slots arranged in intercommunicating relation, closing the restricted portion of the slots with a hardenable flowable insulating filler, hardening the filler, casting a winding in the winding slots, and reducing the outer diameter of the assembled laminations to the desired diameter within the range of the restricted slot portion containing the filler.

3. The method of making a dynamo-electric machine which comprises forming in core laminations a series of open winding slots with a relatively small restricted opening on the outer side thereof, assembling a group of the laminations with the winding slots arranged in intercommunicating relation, rolling the assembled laminations with the restricted openings in contact with a flowable plastic filler on a roll to close the restricted openings, and casting a winding in the winding slots.

4. The method of making a dynamo-electric machine which comprises forming in core laminations a series of closed winding slots with a relatively small restricted notch on the outer side thereof, assembling a group of the laminations with the winding slots arranged in intercommunicating relation, filling the restricted notch with a hardenable flowable insulating filler, hardening the filler casting a winding in the winding slots, and reducing the outer diameter of the assembled laminations to open the restricted notch to the external periphery of the laminations forming an open slot core.

5. The method of making a dynamo-electric machine which comprises forming in core laminations a series of closed winding slots with a relatively small restricted V-notch on the outer side thereof, assembling a group of the laminations with the winding slots arranged in intercommunicating relation, spraying a hardenable insulating filler on the restricted notch to close communication thereof with the winding slot, hardening the filler, casting a winding in the winding slots, and reducing the outer diameter of the assembled laminations to open the restricted notch to the external periphery of the laminations forming an open slot core.

HOWARD MAXWELL.